(12) United States Patent
Ishikawa et al.

(10) Patent No.: US 9,260,304 B2
(45) Date of Patent: Feb. 16, 2016

(54) HYDROGEN SEPARATION DEVICE AND METHOD FOR OPERATING SAME

(75) Inventors: Takao Ishikawa, Tokyo (JP); Kazuhiro Yamamura, Yasugi (JP)

(73) Assignee: Hitachi Metals, Ltd., Tokyo (JP)

(*) Notice: Subject to any disclaimer, the term of this patent is extended or adjusted under 35 U.S.C. 154(b) by 0 days.

(21) Appl. No.: 14/344,611

(22) PCT Filed: Sep. 12, 2012

(86) PCT No.: PCT/JP2012/073290
§ 371 (c)(1),
(2), (4) Date: May 7, 2014

(87) PCT Pub. No.: WO2013/039092
PCT Pub. Date: Mar. 21, 2013

(65) Prior Publication Data
US 2014/0271450 A1    Sep. 18, 2014

(30) Foreign Application Priority Data

Sep. 13, 2011   (JP) .................................. 2011-199731

(51) Int. Cl.
*B01D 53/22* (2006.01)
*B01D 71/02* (2006.01)
(Continued)

(52) U.S. Cl.
CPC ................ *C01B 3/508* (2013.01); *B01D 65/08* (2013.01); *B01D 71/022* (2013.01); *C01B 3/503* (2013.01);
(Continued)

(58) Field of Classification Search
CPC ............... B01D 53/228; B01D 71/022; B01D 2256/16; B01D 2257/108; B01D 2311/10; B01D 2311/106; B01D 2311/12; B01D 65/08; C01B 3/501; C01B 3/503; C01B 3/508; C22C 5/04; C22C 27/02; C22C 27/025; C22C 30/00; H01M 8/04955; H01M 8/0687
USPC .......................................................... 95/56
See application file for complete search history.

(56) References Cited

U.S. PATENT DOCUMENTS

| 4,472,176 A * | 9/1984 | Rubin .............................. 95/56 |
| 2004/0182239 A1* | 9/2004 | Erickson et al. ................. 95/55 |

(Continued)

FOREIGN PATENT DOCUMENTS

| EP | 1 566 457 A1 | 8/2005 |
| JP | 2001-118594 A | 4/2001 |

(Continued)

OTHER PUBLICATIONS

Kazuhiro Yamamura et al., Improvement in Hydrogen Embrittlement Properties Nb—Ni—Ti Alloy Based Hydrogen Permeable Film, Hitachi Metals Technical Review, 2011, pp. 14-19, vol. 27.

(Continued)

*Primary Examiner* — Jason M Greene
(74) *Attorney, Agent, or Firm* — Crowell & Moring LLP

(57) ABSTRACT

It is an objective of the invention to provide a method for operating hydrogen separation devices which is capable of efficiently suppressing hydrogen embrittlement in a hydrogen separation alloy membrane and to provide a hydrogen separation device that performs favorably during repeated starting/stopping operations thereof. There is provided a method for operating a hydrogen separation device for separating hydrogen from a mixture hydrogen gas using a membrane separation technique with a hydrogen separation alloy membrane. The method comprises the successive steps of: stopping supply of the mixture hydrogen gas to the hydrogen separation alloy membrane with a temperature of the membrane within a range from 300 to 600° C.; supplying an oxidizing gas over a predetermined duration to at least an upstream side of the membrane with a temperature of the membrane within a range from 300 to 600° C.; and lowering the temperature of the membrane to below 200° C.

5 Claims, 2 Drawing Sheets

(51) Int. Cl.
    *C01B 3/50*     (2006.01)
    *C22C 27/02*     (2006.01)
    *C22C 30/00*     (2006.01)
    *B01D 65/08*     (2006.01)
    *H01M 8/04*     (2006.01)
    *H01M 8/06*     (2006.01)
    *C22C 5/04*     (2006.01)

(52) U.S. Cl.
    CPC . *C22C 5/04* (2013.01); *C22C 27/02* (2013.01); *C22C 30/00* (2013.01); *H01M 8/04955* (2013.01); *H01M 8/0687* (2013.01); *B01D 2256/16* (2013.01); *B01D 2257/108* (2013.01); *B01D 2311/10* (2013.01); *Y02E 60/50* (2013.01)

(56) References Cited

U.S. PATENT DOCUMENTS

2005/0217480 A1*   10/2005   Aoki .................... B01D 71/022
    95/56

2010/0092333 A1*   4/2010   Yamamura ........... B01D 53/228
    420/417
2012/0138196 A1*   6/2012   Yamamura ........... B01D 71/022
    148/557

FOREIGN PATENT DOCUMENTS

| JP | 2002-128505 | * | 5/2002 | ............. B01D 53/22 |
| JP | 2002-128505 A | | 5/2002 | |
| JP | 2003-112905 A | | 4/2003 | |
| JP | 2003-334417 A | | 11/2003 | |
| JP | 2006-274297 | * | 10/2006 | ............. B01D 71/02 |
| JP | 2006-274297 A | | 10/2006 | |

OTHER PUBLICATIONS

European Search Report issued in European counterpart Application No. 12831236.0 dated Apr. 7, 2015 (Seven (7) pages).

* cited by examiner

HYDROGEN SEPARATION DEVICE AND METHOD FOR OPERATING SAME

TECHNICAL FIELD OF THE INVENTION

The present invention relates to techniques for separating and purifying hydrogen gas from a hydrogen gas mixture using a hydrogen separation alloy membrane. More specifically, the present invention relates to a hydrogen separation device using any hydrogen separation alloy membrane other than a palladium-based alloy membrane and a method for stopping the device during operation.

DESCRIPTION OF BACKGROUND ART

Hydrogen gas (hereinafter referred to simply as hydrogen) has received attention in recent years as a clean energy source that emits no green house effect gas such as $CO_2$ when burned. Since little hydrogen exists in the air (1 ppm or less), normally it is manufactured by steam-reforming hydrocarbons.

In this hydrogen manufacturing process, carbon monoxide (CO) and/or carbon dioxide ($CO_2$) are produced together with hydrogen ($H_2$) while a hydrocarbon (such as methane: $CH_4$) as an unreacted raw material gas and steam ($H_2O$) remain. Subsequently, hydrogen is separated from a mixture of these gases and purified.

Representative hydrogen separation/purification methods include pressure swing adsorption (PSA) and membrane separation. While PSA allows production of high purity hydrogen with the use of a plurality of adsorption towers, it has a disadvantage of tending to require a large and complicated system. On the other hand, membrane separation, though having an advantage of requiring a small and simplified system, has a disadvantage of high material costs because it has conventionally used palladium-based alloy membranes (e.g., Pd—Ag alloy membranes) as a separation membrane.

Therefore, various studies have been conducted on inexpensive metallic membranes as potential substitutes for palladium-based alloy membranes and hydrogen separation devices using such inexpensive metallic membranes. As a result, it has been reported that vanadium (V), niobium (Nb), and tantalum (Ta) each have high hydrogen permeability as a metal simple substance, and hydrogen separation alloy membranes of multi-phase alloys of those metals and other metals (e.g., titanium (Ti), nickel (Ni), cobalt (Co), zirconium (Zr), and hafnium (Hf)) exhibit high hydrogen permeability.

In particular, Nb—Ni—Ti-based alloy membranes are attracting attention for their high general potentials in terms of hydrogen permeability and hydrogen embrittlement resistance (see, for example, Non-Patent Literature 1).

However, there is a problem that in the case where any hydrogen separation membrane other than palladium-based alloy membranes is used in a hydrogen separation device, when the device is stopped (or when the temperature of the device is lowered) with hydrogen present around the hydrogen separation alloy membrane, the hydrogen separation alloy membrane degrades (so-called hydrogen embrittlement). In order to solve such a problem, various hydrogen separation devices and control methods have been studied and suggested.

For example, Patent Literature 1 (JP 2001-118594 A) discloses a fuel cell system for generating power by the reaction between hydrogen and oxygen. When the fuel cell system is stopped, the supply of fuel to a reforming apparatus for producing a reformed gas with fuel and air is shut off. At the same time, air is introduced into the side of the reforming apparatus of a hydrogen separation alloy membrane connected downstream of the reforming apparatus for separating only hydrogen from the reformed gas, and a valve of a hydrogen supply line connected to the permeate side of the hydrogen separation alloy membrane is closed. This removes hydrogen on the side of the reforming apparatus and on the permeate side of the hydrogen separation alloy membrane.

According to Patent Literature 1, when the fuel cell system is stopped, hydrogen, which causes degradation of a hydrogen separation alloy membrane, in the hydrogen separation alloy membrane can be positively and easily removed, and a difference of pressure between both electrodes of the fuel cell, which causes degradation of fuel cell components, can be suppressed without using an inert gas (for example, nitrogen gas).

Patent Literature 2 (JP 2003-112905 A) discloses a fuel reforming system provided with a water vaporizer for producing steam and a reformer for producing a hydrogen-rich reformed gas by the reformation reaction between fuel and water. The reformer is a membrane reactor composed of a reforming layer and a pure hydrogen layer that are adjacent with at least a hydrogen separation alloy membrane therebetween. When the system is stopped, only steam produced by the water vaporizer is supplied to the reforming layer and the pure hydrogen layer so as to maintain a predetermined temperature at which hydrogen embrittlement in the hydrogen separation alloy membrane can be avoided. After steam is supplied in the amount necessary to purge the residual gas in the reforming layer and the pure hydrogen layer, air is supplied to the reformer.

According to Patent Literature 2, before conducting the purge using air when the system is stopped, conducting the purge using steam eliminates the need for conducting a purge using an inert gas. As a result, any storage means such as a cylinder is not necessary for the fuel reforming system, which makes the fuel reforming system more space efficient. Moreover, when any residual gas, such as hydrogen, is present in the fuel reforming system, the hydrogen separation alloy membrane is maintained at temperatures at which hydrogen embrittlement does not occur. Consequently, hydrogen embrittlement in the hydrogen separation alloy membrane can be prevented.

Patent Literature 3 (JP 2003-334417 A) discloses a protection method for a device using a hydrogen permeable membrane. The device has a hydrogen-permeable membrane composed of a hydrogen-permeable metal or alloy. In the device, pipes connected to the space on the hydrogen-supply side and the space on the hydrogen-permeate side of the hydrogen permeable membrane are each provided with one or more temperature sensitive valves using heat as a power source, which are operated by the heat of the device itself. When the device is started, these valves detect the temperature rise of the device and automatically enter into a steady operation state. When the device is stopped, the valves detect the temperature drop of the device and automatically operate so as to remove hydrogen in the spaces connected to the hydrogen permeable membrane.

According to Patent Literature 3, since there is no need to expose the hydrogen permeable membrane to hydrogen at temperatures below the service temperature limit, fractures in the membrane can be prevented. Moreover, by using temperature sensitive valves using heat as a power source, there can be provided a system that does not consume any specific electrical energy for valve operations necessary for starting/stopping a hydrogen permeable membrane and does not require any electronic control.

CITATION LIST

Patent Literature

Patent Literature 1: Japanese Patent Laid-open No. 2001-11859;
Patent Literature 2: Japanese Patent Laid-open No. 2003-112905; and
Patent Literature 3: Japanese Patent Laid-open No. 2003-334417.

Non-Patent Literature

Non-Patent Literature 1: Kazuhiro YAMAMURA and Masahiro TOBISE, "Improvement in Hydrogen Embrittlement Properties of Nb—Ni—Ti Alloy Based Hydrogen Permeable Film", Hitachi Metals Technical Review, vol. 27 (2011), pp. 14-19.

SUMMARY OF THE INVENTION

Problems to be Solved by the Invention

Patent Literatures 1 to 3 disclose a technical idea that since lowering the temperature with hydrogen present in and/or around a hydrogen separation alloy membrane (hydrogen permeable membrane) leads to degradation of the hydrogen separation alloy membrane, it is preferable to provide a process for removing hydrogen in the hydrogen separation alloy membrane with the temperature maintained above a certain temperature. However, even with these conventional techniques, it is difficult to remove residual hydrogen in a hydrogen separation alloy membrane efficiently in a short period of time and suppress embrittlement cracking in a hydrogen separation alloy membrane.

Specifically, Patent Literature 1 does not describe any specific temperature and duration for hydrogen removal, and as a result, the process for removing hydrogen from a hydrogen separation alloy membrane in actual operation is unfortunately inefficient, resulting in excessive time for the process or in degradation of the hydrogen separation alloy membrane due to insufficient hydrogen removal.

Although Patent Literature 2 describes conducting a purge using steam before conducting a purge using air, a purge with steam cannot remove hydrogen present in a hydrogen separation alloy membrane, and embrittlement in the hydrogen separation alloy membrane cannot be suppressed.

Moreover, although Patent Literature 3 describes a method for removing hydrogen in spaces connected to a hydrogen separation alloy membrane using temperature sensitive valves, as with Patent Literature 2, hydrogen present in the hydrogen separation alloy membrane cannot be removed, and embrittlement in the hydrogen separation alloy membrane cannot be suppressed.

In view of forgoing, it is an objective of the present invention to provide a method for operating hydrogen separation devices which is capable of efficiently suppressing hydrogen embrittlement in a hydrogen separation alloy membrane and to provide a hydrogen separation device that performs favorably during repeated starting/stopping operations thereof.

Solution to Problems

In order to solve the problems above, the inventors repeatedly carried out experimental and discussions on the behavior of hydrogen desorbed from a surface of a hydrogen separation alloy membrane in a hydrogen separation device in operation. As a result, the inventors have revealed that the use of an oxidizing gas as an atmosphere on a surface of a hydrogen separation alloy membrane accelerates recombination of hydrogen atoms at the surface of the hydrogen separation alloy membrane and a rate of desorption of hydrogen from the surface, which makes it possible to reduce the hydrogen content in the membrane efficiently within a very short period of time. Moreover, the inventors have clarified preferred conditions of temperature and the like under which hydrogen is efficiently desorbed to achieve the present invention.

(I) According to one aspect of the present invention, there is provided a method for operating a hydrogen separation device for separating hydrogen from a mixture hydrogen gas using a membrane separation technique. The hydrogen separation device uses a hydrogen separation alloy membrane. The method comprises the successive steps of: stopping supply of the mixture hydrogen gas to the hydrogen separation alloy membrane with a temperature of the hydrogen separation alloy membrane within a range from 300 to 600° C.; supplying an oxidizing gas over a predetermined period of time to at least an upstream side of the hydrogen separation alloy membrane with a temperature of the hydrogen separation alloy membrane within a range from 300 to 600° C.; and lowering the temperature of the hydrogen separation alloy membrane to below 200° C.

In the above aspect (I) of the invention, the following modifications and changes can be made.

(i) The predetermined period of time is 8 to 55 minutes per 0.1 mm in thickness of the hydrogen separation alloy membrane.

(ii) Amount of residual hydrogen in the hydrogen separation alloy membrane is decreased to 300 ppm or less by the step of supplying the oxidizing gas.

(iii) The hydrogen separation alloy is an alloy containing Nb.

(iv) The alloy containing Nb is an alloy containing x percent by mass of Ni and y percent by mass of Ti ($10 \leq x < 40$, $10 \leq y < 30$) with the rest being composed of Nb and inevitable impurities.

(v) A thickness of the hydrogen separation alloy membrane is 0.01 to 1 mm.

(II) According to another aspect of the invention, there is provided a hydrogen separation device for separating hydrogen from a mixture hydrogen gas using a membrane separation technique. The hydrogen separation device comprises: a hydrogen separator including a hydrogen separation alloy membrane and partitioned by the hydrogen separation alloy membrane into a mixture gas chamber and a purified hydrogen chamber; a heater for adjusting the temperature of the hydrogen separator; a gas supply pipe connected to the mixture gas chamber; a mixture gas chamber exhaust pipe connected to the mixture gas chamber; a purified hydrogen chamber purge pipe connected to the purified hydrogen chamber; a purified hydrogen chamber exhaust pipe connected to the purified hydrogen chamber; a mixture hydrogen gas supply pipe connected to the gas supply pipe; an oxidizing gas supply pipe connected to the gas supply pipe; and a plurality of valves individually disposed in each of the pipes. The hydrogen separation device further comprises a heater/valve controller for controlling the heater and the plurality of valves so that: with a temperature of the hydrogen separation alloy membrane within the range from 300 to 600° C., supply of the hydrogen gas mixture is stopped; an oxidizing gas is supplied to the mixture gas chamber and the purified hydrogen chamber for 8 to 55 minutes per 0.1 mm in thickness of the hydrogen separation alloy membrane; and the temperature of the hydrogen separation alloy membrane is lowered to below 200° C. after steam produced by a chemical reaction between hydrogen in the hydrogen separation alloy membrane and the oxidizing gas is exhausted through the mixture gas chamber exhaust pipe and the purified hydrogen chamber exhaust pipe.

In the above aspect (II) of the invention, the following modifications and changes can be made.

(vi) The hydrogen separation alloy membrane is composed of an alloy containing Nb.

(vii) The alloy containing Nb is an alloy containing x percent by mass of Ni and y percent by mass of Ti ($10 \leq x < 40$, $10 \leq y < 30$) with the rest being composed of Nb and inevitable impurities, and the thickness of the hydrogen separation alloy membrane is 0.01 to 1 mm.

Advantages of the Invention

According to the present invention, it is possible to provide a method for operating hydrogen separation devices which is capable of efficiently suppressing hydrogen embrittlement in a hydrogen separation alloy membrane. As a result, there can be provided a hydrogen separation device that performs favorably during repeated starting/stopping operations thereof and requires low material costs.

DETAILED DESCRIPTION OF THE PREFERRED EMBODIMENTS

Preferred embodiments of the present invention will be described hereinafter with reference to the accompanying drawings. However, the present invention is not limited to the specific embodiments described below, and various combinations and modifications are possible as appropriate without departing from the spirit and scope of the invention.

(Manufacture of Hydrogen Separation Alloy Membrane)

Raw material metals were mixed so that the mixture would contain 25 percent by mass of Ni and 21 percent by mass of Ti with the rest being composed of Nb and impurities. The mixture was subjected to high frequency melting to cast an Nb—Ni—Ti-based alloy (the thus manufactured alloy will be hereinafter denoted by Nb-25Ni-21Ti).

The thus obtained ingot was subjected to hot forging, hot rolling, and cold rolling into a thin plate having a thickness of 0.1 mm. It was also subjected to intermediate annealings through the cold rolling process and a final annealing after the final rolling.

The thus obtained thin plate was cut into a desired shape, and then a Pd thin film (100 to 200 nm in thickness) was sputter-deposited on both surfaces of the thin plate as a catalyst for having hydrogen molecules dissolve into atoms and hydrogen atoms recombine.

(Hydrogen Permeation Test)

A pressure cycle hydrogen permeability test (difference of hydrogen pressure between the upstream side and the downstream side of the hydrogen permeable membrane: 0 to 0.2 MPa) was conducted in a constant thermal environment (350° C.) in the same procedure as in Non-Patent Literature 1. There was generated no fracture in the hydrogen separation alloy membrane, even against 100 cycles of pressure fluctuation. This result indicated that the above hydrogen separation alloy membrane had sufficient hydrogen embrittlement resistance at operating temperatures of a hydrogen separation device.

Next, a pressure cycle and temperature cycle hydrogen permeability test was conducted (the temperature was lowered from 350° C. to 100° C. per cycle of pressure fluctuation). As a result, a fracture occurred in the hydrogen separation alloy membrane after several cycles (e.g., three cycles), and it was observed that lowering the temperature of the hydrogen separation alloy membrane under a hydrogen atmosphere promoted hydrogen embrittlement.

(Hydrogen Desorption Rate of Hydrogen Permeable Membrane)

As mentioned above, so far, no reports have been made on and no clarification has been given to the desorption behavior of hydrogen absorbed in Nb—Ni—Ti-based alloy membranes. In order to clarify the desorption behavior of hydrogen, the inventors investigated a rate of hydrogen desorption from a hydrogen separation alloy membrane, into which hydrogen had been absorbed, by thermal desorption spectroscopy (TDS). Hydrogen was absorbed into the alloy at a constant temperature of 350° C. for an hour under a hydrogen stream.

Figure 1:
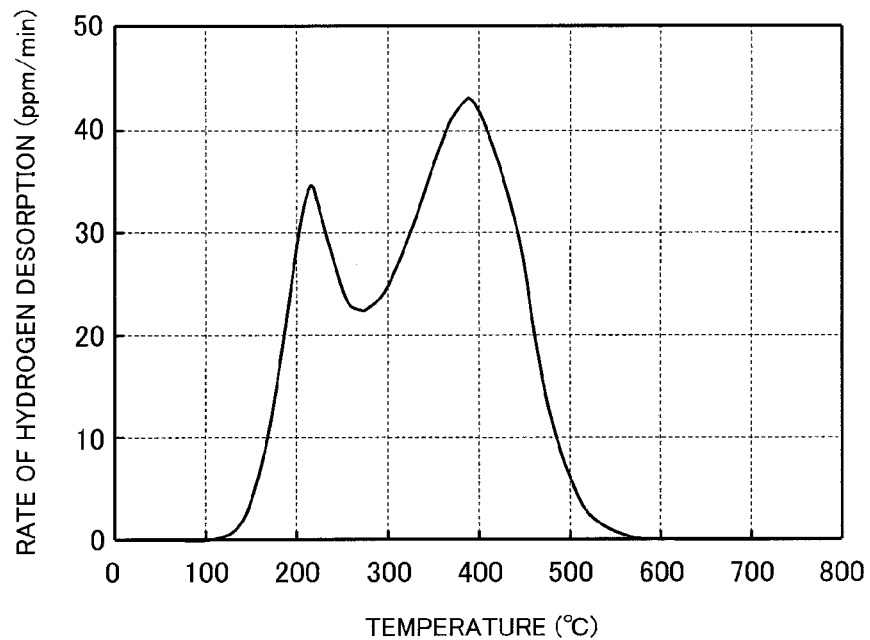
FIG. 1 is a chart showing an example of a hydrogen desorption curve in an Nb-25Ni-21Ti alloy membrane.

FIG. 1 is a chart showing an example of a hydrogen desorption curve in an Nb-25Ni-21Ti alloy membrane.

As shown in FIG. 1, it was revealed that hydrogen desorption starts at approximately 120° C., peaks at temperatures around 200° C. and around 400° C., and reaches completion at approximately 600° C. This result indicated that desorption of hydrogen absorbed in an Nb—Ni—Ti-based alloy membrane requires temperatures at least 120° C. or higher and 600° C. or lower.

(Discussion on Hydrogen Removal from Hydrogen Permeable Membrane)

It can be considered that a hydrogen permeation phenomenon in a hydrogen separation alloy membrane develops into the following elemental processes: attachment of hydrogen molecules to one surface of a membrane→dissociation of hydrogen molecules on the membrane surface→solid-solution of hydrogen atoms into the membrane→diffusion of hydrogen atoms in the membrane→recombination of hydrogen molecules on the other surface of the membrane→desorption of hydrogen molecules from the other surface of the membrane.

Meanwhile, desorption of hydrogen absorbed in a hydrogen separation alloy membrane (solid-solved hydrogen) is considered to be a phenomenon that develops in the following elemental processes: diffusion of hydrogen atoms in the membrane→recombination of hydrogen molecules on a surface of the membrane→desorption of hydrogen molecules from the membrane surface. The temperature is considered to be a factor that contributes to "diffusion of hydrogen atoms in a membrane" and "recombination of hydrogen molecules on a surface of the membrane."

Herein, the above TDS was performed in a high vacuum and the high vacuum is considered to have contributed to "desorption of hydrogen molecules from the membrane surface" in the main. However, when assuming a hydrogen separation device, there is concern that a device structure which allows a constant high vacuum environment would increase its costs.

Accordingly, the inventors considered "reducing the density of hydrogen atoms or molecules around a membrane surface" as a guideline for promoting "desorption of hydrogen molecules from a membrane surface" without using a high vacuum environment. In other words, the inventors speculated that if they can reduce hydrogen atoms or hydrogen molecules themselves around a membrane surface "desorption of hydrogen molecules from the membrane surface" would be promoted by equilibrium displacement.

Moreover, after studying and comparing various ways to promote desorption of hydrogen atoms or hydrogen molecules on a membrane surface, the inventors have found that supplying an oxidizing gas (a gas containing oxygen, such as oxygen gas and air) to a membrane surface to have hydrogen atoms and an oxygen component directly combine on the membrane surface and produce steam ($H_2O$) is a preferred method. By this method, hydrogen can be removed from a hydrogen separation alloy membrane as effectively as in a high vacuum without creating a constant vacuum environment.

In the present invention, treatment in which an oxidizing gas is supplied to a hydrogen separation alloy membrane under the temperature conditions described above is hereinafter referred to as "dehydrogenation treatment." The reasons why dehydrogenation treatment is effective for hydrogen removal are considered as follows.

The elemental process of desorption of hydrogen molecules from a membrane surface is rate-controlled by the partial pressure of hydrogen on the membrane surface. When desorbed hydrogen molecules immediately combine with oxygen on a membrane surface to produce steam, the hydrogen partial pressure on the membrane surface decreases as compared to a case where dehydrogenation treatment is not performed. A decrease in the hydrogen partial pressure on the membrane surface means an increase in a concentration gradient of hydrogen molecules around the membrane surface, which results in promoted desorption of hydrogen molecules from the membrane surface.

Also, promoted desorption of hydrogen molecules from the membrane surface decreases the concentration of hydrogen atoms at the surface, which widens the concentration difference of hydrogen atoms between the surface and the inside of the membrane (that is, increases a concentration gradient of hydrogen atoms). This increase in the concentration gradient of hydrogen atoms promotes diffusion of hydrogen atoms from the inside to the surface of the membrane. It is considered that as an overall effect of these, the efficiency of hydrogen removal from the hydrogen separation alloy membrane is improved.

(Relationship between Dehydrogenation Treatment Conditions and Amount of Residual Hydrogen)

Next, a hydrogen separation alloy membrane in which hydrogen was absorbed was subjected to the dehydrogenation treatment under various conditions (temperature and duration) to determine the amount of residual hydrogen and to investigate the presence or absence of hydrogen embrittlement cracking in the hydrogen separation alloy membrane. Again, hydrogen was absorbed into the alloy at a constant temperature of 350° C. for an hour under a hydrogen stream. The results are shown in FIG. 2.

Figure 2:
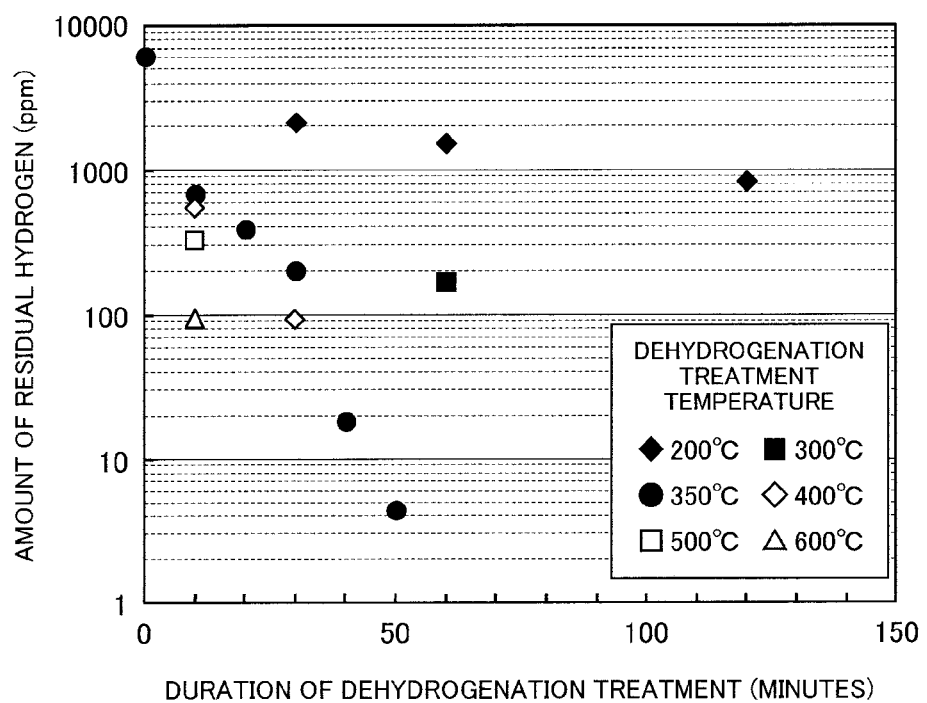
FIG. 2 is an example of a graph showing the relationship between the holding duration of dehydrogenation treatment in an Nb-25Ni-21Ti alloy membrane and the amount of residual hydrogen in the alloy membrane.

FIG. 2 is an example of a graph showing the relationship between holding duration of dehydrogenation treatment in an Nb-25Ni-21Ti alloy membrane and the amount of residual hydrogen in the alloy membrane.

As shown in FIG. 2, the duration required for the amount of residual hydrogen in the membrane to decrease was shorter for higher dehydrogenation treatment temperatures. Also, it was revealed that the hydrogen embrittlement cracking can be restrained when the amount of residual hydrogen in the membrane is 300 ppm or less. Considering the long-term reliability of a separation alloy membrane, the amount of residual hydrogen in the membrane is preferably 200 ppm or less and more preferably 100 ppm or less.

The results obtained from the above measurements and investigations indicated that a specific condition that allowed a amount of residual hydrogen of 300 ppm or less in a hydrogen separation alloy membrane having a thickness of 0.1 mm is a constant temperature of 300° C. for about 55 minutes or more, a constant temperature of 350° C. for about 25 minutes or more, a constant temperature of 400° C. for about 18 minutes or more, a constant temperature of 500° C. for about 10 minutes or more, or a constant temperature of 600° C., at which desorption of hydrogen is completed, for about 8 minutes or more. Meanwhile, dehydrogenation treatment at a constant temperature of 200° C. for as long as 120 minutes could not reduce the amount of residual hydrogen to 300 ppm or less.

Also, from the viewpoint of operating efficiency of a hydrogen separation device using a hydrogen separation alloy membrane, it is desirable that dehydrogenation treatment be completed within an hour, and from the viewpoint of reliability, it is desirable that oxidation of a separation alloy membrane be inhibited. In addition, in the possible case where a coating of Pd is applied on a hydrogen separation alloy membrane for sufficient separation of hydrogen, it is desirable that mutual diffusion of the Pd applied and the components of the hydrogen separation alloy membrane be inhibited as much as possible.

In general consideration of these requirements, a preferred dehydrogenation treatment condition is holding the temperature of a hydrogen separation alloy membrane at not lower than 300° C. but not higher than 600° C. for a prescribed period of time, and a more preferred condition is holding the temperature at not lower than 300° C. but not higher than 500° C. for a prescribed period of time. When the temperature is within the range from 300° C. to 450° C., diffusion of applied Pd can be sufficiently inhibited, and therefore it is more desirable. The most preferred condition is holding the temperature at 300° C. or higher and 400° C. or lower for a prescribed period of time. Also, since the hydrogen permeation flux in a hydrogen separation alloy membrane is inversely proportional to the thickness of the separation alloy membrane, it is desirable that the holding duration of the dehydrogenation treatment be proportional to the membrane thickness.

Moreover, when hydrogen is present in metal at lower than 200° C., a metal hydride can be produced. A metal hydride is mechanically fragile and can be the origin of a fracture under a high-pressure environment. For this reason, operation of the hydrogen separation device including the hydrogen separation membrane needs to be performed in such a way that no metal hydride will be produced in the membrane. In the present invention, therefore, the dehydrogenation treatment is performed before the temperature of a hydrogen separation alloy membrane reaches lower than 200° C. in order to prevent fractures in the hydrogen separation alloy membrane.

(Hydrogen Separation Alloy)

In the present invention, an alloy to be used in a hydrogen separation device is preferably a hydrogen separation alloy containing Nb. More specifically, the hydrogen separation alloy containing Nb is preferably an alloy containing x percent by mass of Ni and y percent by mass of Ti ($10 \leq x < 40$, $10 \leq y < 30$) with the rest being composed of Nb and inevitable impurities.

An Ni content of less than 10 percent by mass leads to reduced hydrogen embrittlement resistance, and an Ni content of more than 40 percent by mass leads to an increased risk of formation of fragile intermetallic compounds in the alloy in addition to reduced hydrogen embrittlement resistance. Also, a Ti content of less than 10 percent by mass leads to reduced hydrogen embrittlement resistance, and a Ti content of more than 30 percent by mass leads to an increased risk of formation of fragile intermetallic compounds in the alloy in addition to reduced hydrogen embrittlement resistance. The alloy may contain elements such as V, Ta, Co, Fe, Zr, Hf and B, which are commonly known to be solid-soluble, in a hydrogen separation alloy membrane composed of Nb, Ni and Ti.

The relationship with the amount of residual hydrogen was studied by changing the composition of the hydrogen separation alloy.

Raw material metals were mixed so that the mixture would contain 31.5 percent by mass of Ni and 25.7 percent by mass of Ti with the rest being composed of Nb and inevitable impurities, and the mixture was subjected to high frequency melting to cast an Nb—Ni—Ti-based alloy (the thus manufactured alloy will be hereinafter denoted by Nb-32Ni-26Ti). Also, raw material metals were mixed so that the mixture would contain 38.4 percent by mass of Ni and 31.3 percent by mass of Ti with the rest being composed of Nb and inevitable impurities, and the mixture was subjected to high frequency melting to cast an Nb—Ni—Ti-based alloy (the thus manufactured alloy will be hereinafter denoted by Nb-38Ni-31Ti).

Thus obtained ingot was each subjected to hot forging, hot rolling, and cold rolling into a thin plate having a thickness of 0.1 mm. It was also subjected to the intermediate annealings through the cold rolling process and the final annealing after the final rolling. The thus obtained thin plate was cut into a desired shape, and then a Pd thin film (100 to 200 nm in thickness) was sputter-deposited on both surfaces of the thin plate as a catalyst for having hydrogen molecules dissolve into atoms and hydrogen atoms recombine.

Hydrogen was absorbed into each of the Nb-32Ni-26Ti and Nb-38Ni-31Ti hydrogen separation alloy membranes in hydrogen at a constant temperature of 350° C. for an hour. Next, each was subjected to dehydrogenation treatment (in air at a constant temperature of 350° C. for 40 minutes), and then the amount of residual hydrogen in each hydrogen separation membrane was measured by TDS.

Table 1 shows a comparison of the amount of residual hydrogen among Nb-25Ni-21Ti, Nb-32Ni-26Ti, and Nb-38Ni-31Ti after the dehydrogenation treatment (in air at a constant temperature of 350° C. for 40 minutes).

TABLE 1

Comparison of Amount of Residual Hydrogen after Dehydrogenation Treatment.

| | Nb—25Ni—21Ti | Nb—32Ni—26Ti | Nb—38Ni—31Ti |
|---|---|---|---|
| Amount of Residual Hydrogen | 18 ppm | 199 ppm | 627 ppm |

As shown in Table 1, it was observed that the amount of residual hydrogen tended to increase as the Ni content and the Ti content increased (i.e., as the Nb content decreased) under the same dehydrogenation treatment condition. The cause of this is unclear, but it can be considered as below.

In Nb—Ni—Ti-based alloys, it is known that Nb is an element that contributes to solid solution and diffusion of hydrogen. Herein, hydrogen transfer (diffusion) is thought to occur via bonds between Nb atoms present in the alloy as a major pathway. In this case, a less content of Nb means less bonds between Nb atoms, which makes more likely for the pathway for hydrogen transfer to be interrupted, thus inhibiting diffusion. It is considered that by this mechanism, the transfer of hydrogen dissolved in an alloy with a less Nb content is inhibited in the dehydrogenation treatment process, and as a result, it is more difficult for the hydrogen to be desorbed to the outside.

In the present invention, the thickness of an alloy membrane to be used in the hydrogen separation device is preferably not less than 0.01 mm but not more than 1 mm, more preferably 0.03 mm or more and 0.5 mm or less, and even more preferably 0.05 mm or more and 0.2 mm or less.

Since the hydrogen permeation flux in a hydrogen separation alloy membrane is inversely proportional to the thickness of the separation alloy membrane, the thinner the membrane thickness is, the more hydrogen can be taken out. When the thickness of the membrane is less than 0.01 mm, the strength of the membrane is insufficient, and therefore a fracture is more prone to occur when pressure is applied to the membrane. Meanwhile, when the thickness of the membrane is more than 1 mm, the hydrogen permeation flux is too small, therefore inefficient.

(Hydrogen Separation Device and Method for Operating Thereof)

Figure 3:
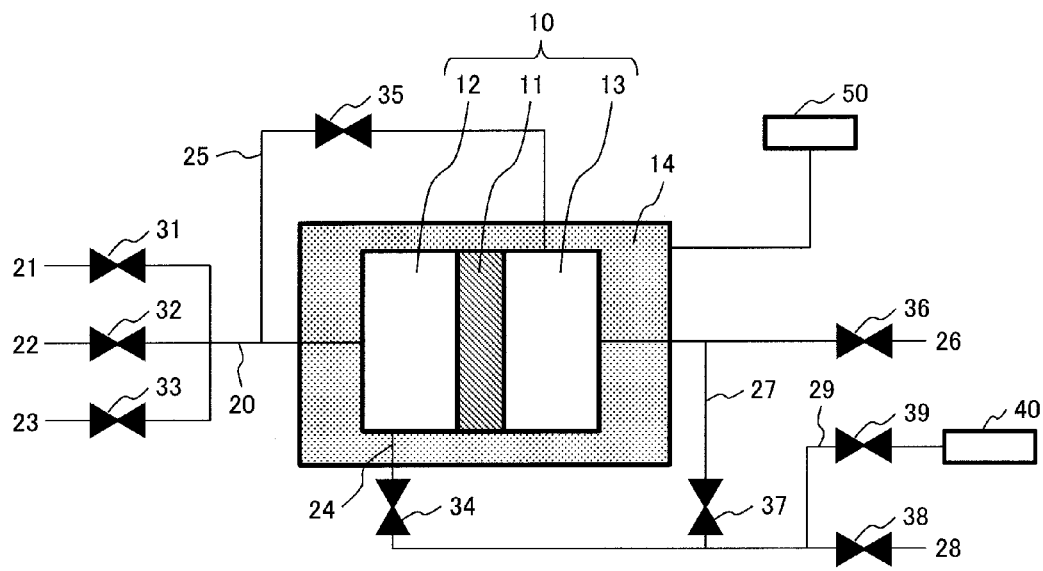
FIG. 3 is a schematic view showing major components of a hydrogen separation device according to the present invention.

FIG. 3 is a schematic view showing major components of a hydrogen separation device according to the present invention.

As shown in FIG. 3, a hydrogen separation device according to the present invention is basically a device for separating hydrogen from a mixture hydrogen gas by a hydrogen separator 10 including a hydrogen separation alloy membrane 11. The hydrogen separator 10 is partitioned by the hydrogen separation membrane 11 into a mixture gas chamber 12 and a purified hydrogen chamber 13, and its temperature is controlled by a heater 14. To the mixture gas chamber 12, a gas supply pipe 20 and a mixture gas chamber exhaust pipe 24 are connected. To the gas supply pipe 20, a mixture hydrogen gas supply pipe 21, a purge gas supply pipe 22, and an oxidizing gas supply pipe 23 are connected. To the purified hydrogen chamber 13, a purified hydrogen chamber purge pipe 25, a purified hydrogen collection pipe 26, and a purified hydrogen chamber exhaust pipe 27 are connected. The mixture gas chamber exhaust pipe 24, the purified hydrogen chamber exhaust pipe 27, and an evacuation pipe 29 are connected to an exhaust pipe 28. To the evacuation pipe 29, a vacuum pump 40 is connected.

Also, the pipes 21 to 29 are provided with valves 31 to 39, respectively. Moreover, the hydrogen separation device according to the present invention is provided with a heater/valve controller 50 for controlling the temperature of the heater 14 and the opening and closing of each of the valves 31 to 39. In FIG. 3, wiring for connecting the heater/valve controller 50 and each of the valves 31 to 39 is not shown for the sake of simplicity.

Next, a method for operating a hydrogen separation device according to the present invention will be described with reference to FIG. 3.

(Activation of Hydrogen Separation Device and Hydrogen Purification)

First, the valve 34 (mixture gas chamber exhaust pipe valve), the valve 37 (purified hydrogen chamber exhaust pipe valve), and the valve 39 (evacuation pipe valve) are opened, and with all the other pipes closed, the vacuum pump 40 is brought into operation to evacuate residual gas from the inside of the hydrogen separator 10 and each pipe (an evacuation process).

Next, the hydrogen separator 10 is heated to 300° C. to 600° C. (operation temperatures) by the heater (a heating process).

Next, the valve 31 (mixture hydrogen gas supply pipe valve), and the valve 34 (mixture gas chamber exhaust pipe valve), the valve 36 (purified hydrogen collection pipe valve), and the valve 38 (exhaust pipe valve) are opened, and with all the other valves closed, a mixture hydrogen gas is supplied from the mixture hydrogen gas supply pipe 21 to the mixture gas chamber 12 of the hydrogen separator 10. This allows only hydrogen to permeate the hydrogen separation alloy membrane 11 to be separated and purified, thereby making it possible to obtain high purity hydrogen from the purified hydrogen collection pipe 26.

On the other hand, the other gas components that have not permeated the hydrogen separation alloy membrane 11 are discharged to the outside of the system through the mixture gas chamber exhaust pipe 24 and the exhaust pipe 28. Such is a hydrogen purification process.

(Dehydrogenation Treatment of Hydrogen Separation Alloy Membrane and Stopping of Device)

After the hydrogen purification process is completed, first, the hydrogen separator 10 is adjusted to prescribed temperatures (300° C. to 600° C.) by the heater 14. Next, the valve 32 (purge gas supply pipe valve), the valve 34 (mixture gas chamber exhaust pipe valve), the valve 35 (purified hydrogen chamber purge pipe valve), the valve 37 (purified hydrogen chamber exhaust pipe valve), the valve 38 (exhaust pipe valve) are opened, and with all the other valves closed, a purge gas (a gas that does not chemical combine with hydrogen, such as nitrogen, argon and steam) is introduced through the purge gas supply pipe 22, thereby exhausting the gas-phase hydrogen in the system by replacement (a replace-exhausting process).

Also, instead of the replace-exhausting process, the gas phase hydrogen may be evacuated from the inside of the hydrogen separator 10 and each pipe by opening the valve 34 (mixture gas chamber exhaust pipe valve), the valve 35 (purified hydrogen chamber purge pipe valve), the valve 37 (purified hydrogen chamber exhaust pipe valve), and the valve 39 (evacuation pipe valve) and bringing the vacuum pump 40 into operation with all the other valves closed (an evacuation process).

When the evacuation process is performed, the above-described replace-exhausting process may not be performed. Also, if the replace-exhausting process is not performed, the purge gas supply pipe 22 and the valve 32 may not be provided for the hydrogen separation device.

Next, the valve 33 (oxidizing gas supply pipe valve), the valve 34 (mixture gas chamber exhaust pipe valve), the valve 35 (purified hydrogen chamber purge pipe valve), the valve 37 (purified hydrogen chamber exhaust pipe valve), and the valve 38 (exhaust pipe valve) are opened, and with all the other valves closed, an oxidizing gas (a gas containing oxygen, such as oxygen gas and air) is supplied through the oxidizing gas supply pipe 23 to the mixture gas chamber 12 and the purified hydrogen chamber 13 of the hydrogen separator 10. By this operation, the residual hydrogen in the hydrogen separation alloy membrane 11 chemically combines with oxygen in the oxidizing gas to form steam, which is discharged to the outside of the system through the mixture gas chamber exhaust pipe 24, the purified hydrogen chamber exhaust pipe 27, and the exhaust pipe 28.

This process is performed for a prescribed period of time (8 to 55 minutes) to reduce the amount of residual hydrogen in the hydrogen separation alloy membrane 11 to 300 ppm or less. The supply of the oxidizing gas may be any amount as long as it is sufficient for all the residual hydrogen in the hydrogen separation alloy membrane 11 to become steam. Such is a dehydrogenation treatment process. Subsequently the temperature of hydrogen separator 10 is lowered, and all the valves are closed to stop the hydrogen separation device (a stopping process).

Going through the above-described cycle allows efficient suppression of hydrogen embrittlement in a hydrogen separation alloy membrane, which makes it possible to provide a method for operating a hydrogen separation device using a hydrogen separation alloy membrane in such a way that the device is capable of performing favorably during repeated starting/stopping operations thereof.

EXAMPLES

In the same manner as described before, a hydrogen separation alloy membrane composed of Nb-25Ni-21Ti was manufactured, and a hydrogen separation device having the configuration shown in FIG. 3 was constructed.

A pressure cycle/temperature cycle hydrogen permeability test was conducted according to the operation method described above. One cycle involved a heating process for heating up to 350° C. in 30 minutes, a hydrogen purification process at 350° C. for an hour, a replace-exhausting process using a nitrogen gas, a dehydrogenation treatment process at 350° C. for 40 minutes, and a stopping process for lowering the temperature to 80° C. in 30 minutes. The results are shown in FIG. 4.

Figure 4:
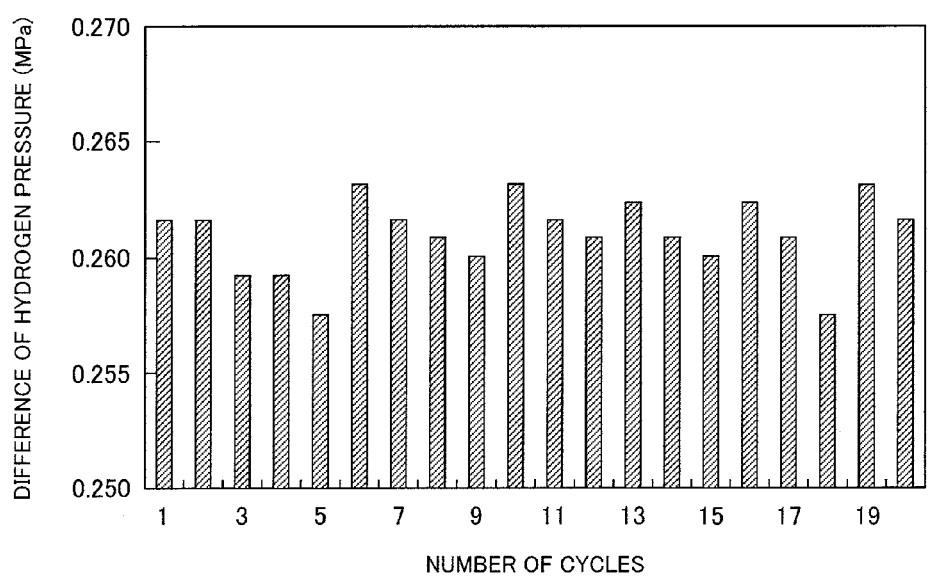
FIG. 4 is a chart showing results of the pressure cycle/temperature cycle hydrogen permeability test in a case where a method for operating hydrogen separation devices according to the present invention was performed.

FIG. 4 is a chart showing results of the pressure cycle/temperature cycle hydrogen permeability test in a case where a method for operating hydrogen separation devices according to the present invention was performed. The vertical axis of the chart represents the difference of hydrogen pressure between the upstream side and the downstream side of the hydrogen separation alloy membrane, and the horizontal axis of the chart represents number of cycles of the pressure cycle/temperature cycle.

As shown in FIG. 4, it was observed that the method for operating hydrogen separation devices according to the present invention led to no noticeable decrease in the hydrogen pressure differential even after 20 cycles, suggesting that no fracture occurred in the hydrogen separation alloy membrane. Actually, no crack was found in the observation of the surfaces of the hydrogen separation alloy membrane taken out after the test.

These facts demonstrated that there can be provided a hydrogen separation device using a hydrogen separation alloy membrane that performs favorably during repeated starting/stopping operations thereof.

LEGEND 10 hydrogen separator,
11 hydrogen separation alloy membrane,
12 mixture gas chamber,
13 purified hydrogen chamber,
14 heater,
20 gas supply pipe,
21 mixture hydrogen gas supply pipe,
22 purge gas supply pipe,
23 oxidizing gas supply pipe,
24 mixture gas chamber exhaust pipe, 25 purified hydrogen chamber purge pipe,
26 purified hydrogen collection pipe,
27 purified hydrogen chamber exhaust pipe,
28 exhaust pipe,
29 evacuation pipe,
31 through 39 valves,
40 vacuum pump, and
50 heater/valve controller.

The invention claimed is:

1. A method for operating a hydrogen separation device for separating hydrogen from a mixture hydrogen gas using a membrane separation technique with a hydrogen separation alloy membrane, wherein the hydrogen separation alloy membrane is an alloy containing x percent by mass of Ni and y percent by mass of Ti ($10 \leq x < 40$, $10 \leq y < 30$) with a remaining portion of the alloy being composed only of Nb and inevitable impurities, and wherein the method comprises the successive steps of:
stopping supply of the mixture hydrogen gas to the hydrogen separation alloy membrane with a temperature of the hydrogen separation alloy membrane within a range from 300 to 600° C.;
supplying an oxidizing gas for a predetermined period of time to at least an upstream side of the hydrogen separation alloy membrane with a temperature of the hydrogen separation alloy membrane within a range from 300 to 600°, so as to decrease an amount of residual hydrogen in the hydrogen separation alloy membrane to 300 ppm or less; and
lowering the temperature of the hydrogen separation alloy membrane to below 200° C.

2. The method for operating a hydrogen separation device according to claim 1, wherein the predetermined period of time is 8 to 55 minutes per 0.1 mm in thickness of the hydrogen separation alloy membrane.

3. The method for operating a hydrogen separation device according to claim 1, wherein amount of residual hydrogen in the hydrogen separation alloy membrane is decreased to 300 ppm or less by the step of supplying the oxidizing gas.

4. The method for operating a hydrogen separation device according to claim 1, wherein a thickness of the hydrogen separation alloy membrane is 0.01 to 1 mm.

5. A hydrogen separation device for separating hydrogen from a mixture hydrogen gas using a membrane separation technique with a hydrogen separation alloy membrane, wherein the hydrogen separation alloy membrane is an alloy containing x percent by mass of Ni and y percent by mass of Ti ($10 \leq x < 40$, $10 \leq y < 30$) with a remaining portion of the alloy being composed only of Nb and inevitable impurities, and a thickness of the hydrogen separation alloy membrane is 0.01 to 1 mm, and wherein the hydrogen separation device comprises:
a hydrogen separator partitioned by the hydrogen separation alloy membrane into a mixture gas chamber and a purified hydrogen chamber;
a heater for adjusting temperatures of the hydrogen separator;
a gas supply pipe connected to the mixture gas chamber;
a mixture gas chamber exhaust pipe connected to the mixture gas chamber;
a purified hydrogen chamber purge pipe connected to the purified hydrogen chamber;
a purified hydrogen chamber exhaust pipe connected to the purified hydrogen chamber;
a mixture hydrogen gas supply pipe connected to the gas supply pipe;
an oxidizing gas supply pipe connected to the gas supply pipe;
a plurality of valves individually disposed in each of the pipes; and
a heater/valve controller which is programed to control the heater and the plurality of valves with the sequential steps of:
adjusting a temperature of the hydrogen separation alloy membrane within a range from 300 to 600° C.,
stopping supply of the mixture hydrogen gas within the temperature range,
supplying an oxidizing gas to the mixture gas chamber and the purified hydrogen chamber for 8 to 55 minutes per 0.1 mm in thickness of the hydrogen separation alloy membrane within the temperature range,
exhausting steam produced by a chemical reaction between hydrogen in the hydrogen separation alloy membrane and the oxidizing gas through the mixture gas chamber exhaust pipe and the purified hydrogen chamber exhaust pipe, and
lowering the temperature of the hydrogen separation alloy membrane to below 200° C.

* * * * *